United States Patent
Su et al.

(10) Patent No.: US 10,381,820 B2
(45) Date of Patent: Aug. 13, 2019

(54) UNDERVOLTAGE PROTECTION CIRCUIT AND OVERVOLTAGE PROTECTION CIRCUIT

(71) Applicant: ANPEC ELECTRONICS CORPORATION, Hsinchu (TW)

(72) Inventors: Chih-Heng Su, Hsinchu (TW); Yang-Fan Su, Hsinchu County (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 314 days.

(21) Appl. No.: 15/581,740

(22) Filed: Apr. 28, 2017

(65) Prior Publication Data
US 2018/0205215 A1   Jul. 19, 2018

(30) Foreign Application Priority Data
Jan. 13, 2017 (TW) .............................. 106101189 A

(51) Int. Cl.
*H02H 3/20* (2006.01)
*H02H 3/24* (2006.01)

(52) U.S. Cl.
CPC .............. *H02H 3/207* (2013.01); *H02H 3/20* (2013.01); *H02H 3/24* (2013.01); *H02H 3/202* (2013.01); *H02H 3/243* (2013.01)

(58) Field of Classification Search
CPC .......... H02H 3/24; H02H 3/2443; H02H 3/20; H02H 3/202; H02H 3/207
USPC ........................................................... 361/90
See application file for complete search history.

(56) References Cited

U.S. PATENT DOCUMENTS

| | | | | |
|---|---|---|---|---|
| 4,642,479 A * | 2/1987 | Lombardi | ............... | G06F 1/189 307/126 |
| 6,418,002 B1 * | 7/2002 | Yang | ......................... | G06F 1/28 361/18 |
| 7,705,579 B1 * | 4/2010 | Hariman | ............... | H02M 3/156 323/284 |
| 2010/0001702 A1 * | 1/2010 | Tateishi | ............. | H02M 3/1588 323/282 |

* cited by examiner

*Primary Examiner* — Zeev V Kitov
(74) *Attorney, Agent, or Firm* — Li & Cai Intellectual Property (USA) Office

(57) ABSTRACT

An undervoltage protection circuit and an overvoltage protection circuit include a first comparator and a second comparator. The first comparator has a first input terminal, a second input terminal, and a first output terminal. The second comparator has a third input terminal, a fourth input terminal, and a second output terminal. The third input terminal receives a reference voltage and the fourth input terminal receives a first feedback voltage. The first and the second output terminals are coupled with a logic device. The first feedback voltage is converted to a second feedback voltage by the delay circuit and the voltage level shifter. The first comparator outputs a detection enabling voltage for undervoltage/overvoltage detection when the first feedback voltage crosses the second feedback voltage. The logic device outputs a protection voltage level undervoltage/overvoltage protection when the first feedback voltage crosses the reference voltage.

10 Claims, 5 Drawing Sheets

UNDERVOLTAGE PROTECTION CIRCUIT AND OVERVOLTAGE PROTECTION CIRCUIT

BACKGROUND OF THE INVENTION

1. Field of the Invention

The present invention relates to an undervoltage protection circuit and an overvoltage protection circuit; more particularly to an undervoltage protection circuit and an overvoltage protection circuit to protect a system or circuit from undervoltage and overvoltage respectively.

2. Description of Related Art

Reference is made to FIG. 1, which is a schematic diagram of conventional undervoltage protection circuits applied to a buck converter circuit, a boost converter circuit, a buck-boost converter circuit, a feedback circuit, a generator, a power generation system, a power supply system, or other power supply devices.

Conventional undervoltage protection circuits include a comparator OP, a blanking timer B1 and a logic device 10. An output terminal of the blanking timer B1 and the comparator OP are coupled with the logic device 10. The comparator OP has a positive terminal + receiving a reference voltage UVREF, and a negative terminal − receiving a feedback voltage FB. Therefore, the comparator OP can compare the reference voltage UVREF with the feedback voltage FB.

FIG. 2A shows the waveforms of the conventional undervoltage protection circuits and FIG. 2B shows the waveforms of another conventional undervoltage protection circuits according to FIG. 1. In practice, the design of the conventional undervoltage protection circuits includes a blanking time. That is, the undervoltage protection is enabled at the end of the blanking time. In particular, the role of the blanking time is to make the feedback voltage FB increase with the reference voltage UVREF and to approach a stable state when the reference voltage UVREF switches from a low level to a high level.

In practice, the ideal timing to enable the undervoltage protection is at the crossing point between the reference voltage UVREF and the feedback voltage FB in FIG. 2A or FIG. 2B. Therefore, the length of the blanking time affects the timing of enabling the undervoltage protection in conventional undervoltage protection circuits.

In FIG. 2A, for example, the design of the length of the blanking time is too short. Therefore, the undervoltage protection circuit enables the undervoltage protection too early, before the feedback voltage FB can reach a stable state. That is, the undervoltage protection is enabled before the point of crossing between the reference voltage UVREF and the feedback voltage FB. Therefore, there is an error voltage ER1 between the reference voltage UVREF and the feedback voltage FB.

In FIG. 2B, on the other hand, the length of the blanking time is too long. Therefore, the undervoltage protection circuit enables the undervoltage protection too late so that the feedback voltage FB drops back after having reached a stable state. That is, the undervoltage protection is enabled after the point of crossing between the reference voltage UVREF and the feedback voltage FB. Therefore, there is an error voltage ER2 between the reference voltage UVREF and the feedback voltage FB, making conventional undervoltage protection circuits inconvenient in practical application.

In addition to conventional undervoltage protection circuits, there are also conventional overvoltage protection circuits. Referring to FIG. 3, which is a schematic diagram of conventional overvoltage protection circuits applied to a buck converter circuit, a boost converter circuit, a buck-boost converter circuit, a generator or other power supply devices. Conventional overvoltage protection circuits include a comparator OP, a blanking timer B1 and a logic device 10. The comparator OP has a positive terminal + receiving a reference voltage OVREF, a negative terminal − receiving a feedback voltage FB. Therefore, the comparator OP can compare the reference voltage OVREF with the feedback voltage FB.

Similar to the conventional undervoltage protection circuits, conventional overvoltage protection circuits also have the issue of an error voltage existing between the reference voltage OVREF and the feedback voltage FB. Therefore, conventional overvoltage protection circuits are also inconvenient in practical application.

SUMMARY OF THE INVENTION

The object of the present disclosure is to improve the blanking time issue in conventional undervoltage and overvoltage protection circuits by a design of two comparators and two feedback voltages making the undervoltage and overvoltage protection circuits of the present disclosure relatively more convenient in practical application.

In order to achieve the aforementioned objects, according to an embodiment of the present disclosure, an undervoltage protection circuit includes a first comparator and a second comparator. The first comparator has a first input terminal, a second input terminal and an output terminal. The first input terminal is coupled with a voltage level shifter, and the voltage level shifter is coupled with a delay circuit. The second comparator has a third input terminal, a fourth input terminal and a second output terminal. The third input terminal receives a reference voltage, and the fourth input terminal receives a first feedback voltage. In particular, the first output terminal and the second output terminal are coupled with a logic device, and the first feedback voltage is converted to a second feedback voltage by the delay circuit and the voltage level shifter. The first input terminal receives the second feedback voltage, and the second input terminal receives the first feedback voltage. Furthermore, the first comparator outputs a detection enabling voltage to the logic device when the first feedback voltage is lower than the second feedback voltage, and the logic device outputs an undervoltage protection voltage level when the first feedback voltage is lower than the reference voltage.

The present disclosure also provides an overvoltage protection circuit, including a first comparator and a second comparator. The first comparator has a first input terminal, a second input terminal and a first output terminal. The second input terminal is coupled with a voltage level shifter, and the voltage level sifter is coupled with a delay circuit. The second comparator has a third input terminal, a fourth input terminal and a second output terminal. The fourth input terminal receives a reference voltage, and the third input terminal receives a first feedback voltage. In particular, the first output terminal and the second output terminal are coupled with a logic device, and the first feedback voltage is converted to a second feedback voltage by the delay circuit and the voltage level shifter. The first input terminal receives the first feedback voltage, and the second input terminal receives the second feedback voltage. Furthermore, the first comparator outputs a detection enabling voltage to the logic device when the first feedback voltage is higher than the second feedback voltage, and the logic device outputs an overvoltage protection voltage level when the first feedback voltage is higher than the reference voltage.

Therefore, the undervoltage and overvoltage protection circuits in the present disclosure improve the blanking time issue by a design of two comparators and two feedback voltages. In particular, neither the undervoltage protection circuit nor the overvoltage protection circuit in the present disclosure includes a blanking time, so that the protection circuits are relatively more convenient in practical application.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
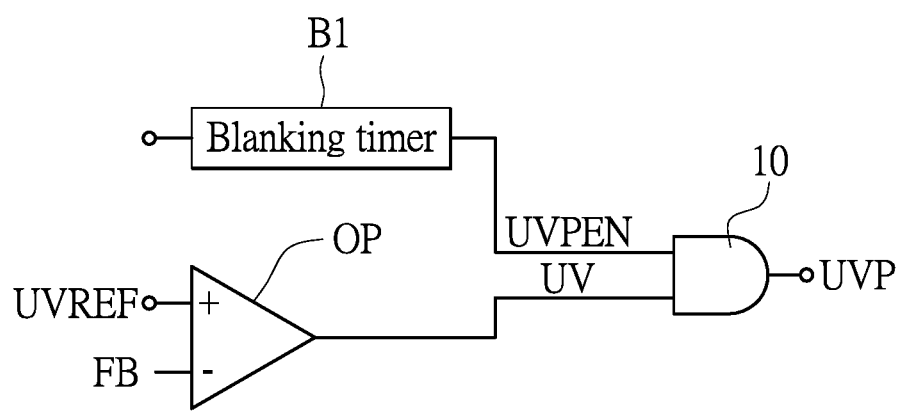
FIG. 1 shows a schematic diagram of a conventional undervoltage protection circuit.
Figure 2A:
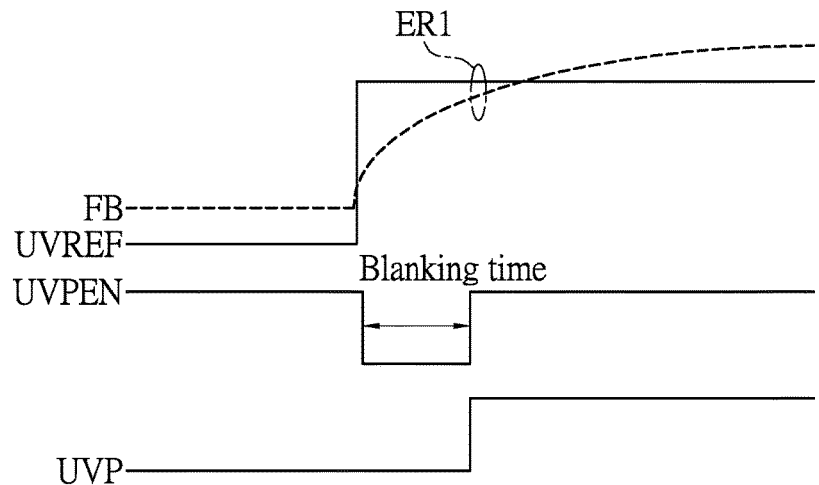
FIGS. 2A and 2B show the waveforms of a conventional undervoltage protection circuit according to FIG. 1.
Figure 2B:
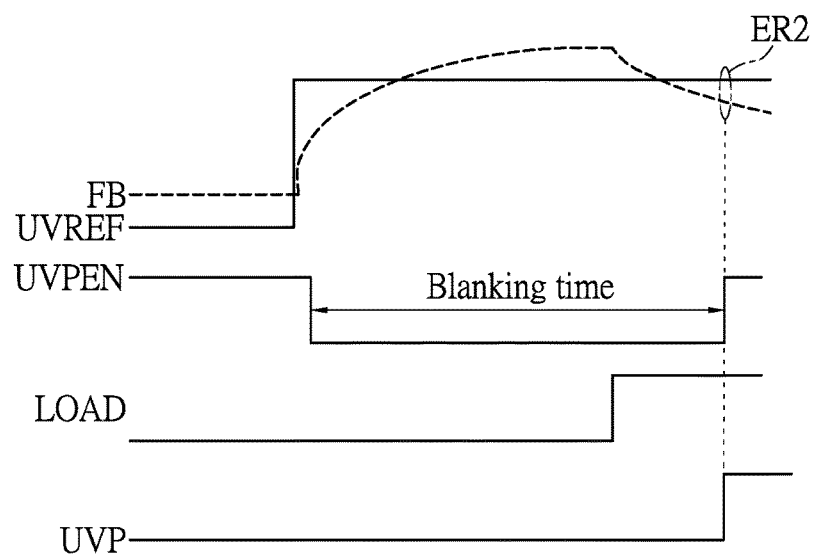
Figure 3:
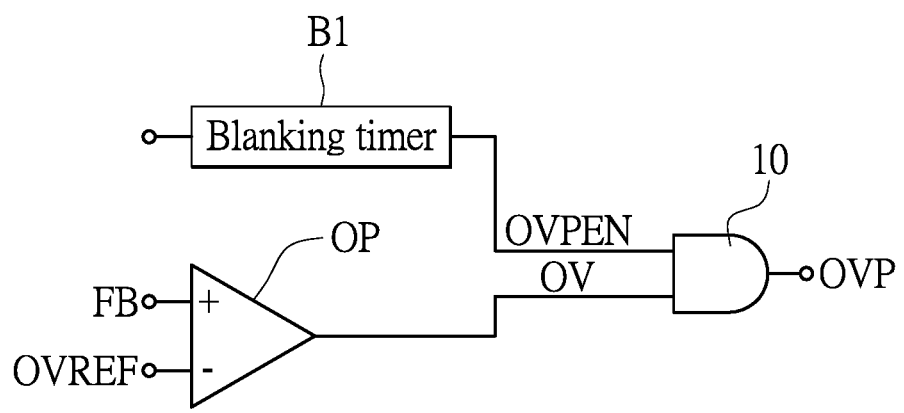
FIG. 3 shows a schematic diagram of a conventional overvoltage protection circuit.
Figure 4:
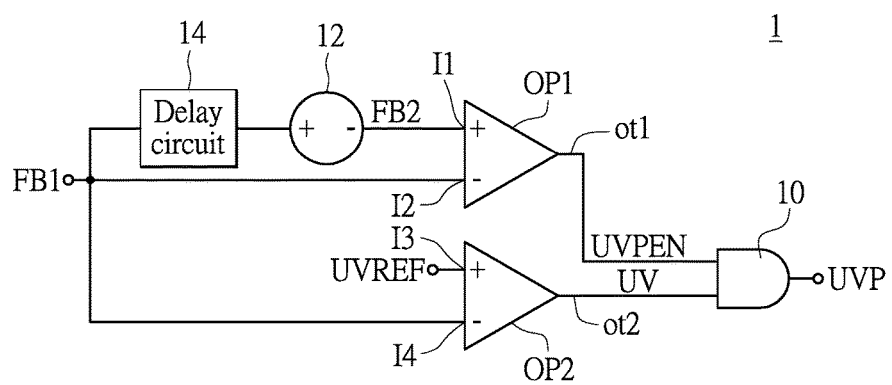
FIG. 4 shows a schematic diagram of an undervoltage protection circuit according to one embodiment of the present disclosure.

FIG. 4 shows a schematic diagram of an undervoltage protection circuit according to one embodiment of the present disclosure. The undervoltage protection circuit 1 includes a first comparator OP1, a second comparator OP2 and a logic device 10. The first comparator OP1 and the second comparator OP2 are coupled with the logic device 10.

In practice, the first comparator OP1 and the second comparator OP2 are electronic components that compare the difference in voltage or current between their two input terminals, and output different voltages according to the result of comparison. The first comparator OP1 and the second comparator OP2 can be voltage comparators. In particular, the first comparator OP1 and the second comparator OP2 output a positive saturation voltage when the voltage in a positive input terminal + is higher than the voltage in a negative input terminal −. On the other hand, the first comparator OP1 and the second comparator OP2 output a negative saturation voltage when the voltage in a positive input terminal + is lower than the voltage in a negative input terminal −. For example, the positive saturation voltage can be a logic high level, and the negative saturation voltage can be a logic low level.

The logic device 10, for example, is an AND gate. The AND gate is a logic electronic component. The logic device 10 has an output terminal outputting a logic high level when both two input terminals of the logic device 10 are logic high level, and outputting a logic low level when at least one of the two input terminals of the logic device 10 is logic low level. That is, the logic device 10 outputs a logic high level only if both the first comparator OP1 and the second comparator OP2 output logic high levels, or otherwise outputs a logic low level.

The first comparator OP1 has a first input terminal IT1, a second input terminal IT2 and a first output terminal OT1. The first input terminal IT1 is coupled with a voltage level shifter 12, and the voltage level shifter 12 is coupled with a delay circuit 14. The second comparator OP2 has a third input terminal IT3, a fourth input terminal IT4 and a second output terminal OT2. The third input terminal IT3 receives a reference voltage UVREF, and the fourth input terminal IT4 receives a first feedback voltage FB1. In particular, the first input terminal IT1 and the third input terminal IT3 are positive input terminals +, and the second input terminal IT2 and the fourth input terminal IT4 are negative input terminals −.

The voltage level shifter 12, for example, can be a voltage offset circuit. In particular, the voltage level shifter 12 has a positive terminal coupled with the delay circuit 14, and a negative terminal coupled with the first input terminal IT1 of the first comparator OP1. The first feedback voltage FB1 is converted to a second feedback voltage FB2 after a deviation voltage is subtracted by the voltage level shifter 12. Therefore, the second feedback voltage FB2 is lower than the first feedback voltage FB1 under general conditions. The delay circuit 14 can be, for example, a resistor-capacitor circuit, a RC delay circuit or other types of delay circuit.

The first output terminal OT1 of the first comparator OP1 and the second output terminal OT2 of the second comparator OP2 are coupled with the logic device 10. The first feedback voltage FB1 is converted to the second feedback voltage FB2 by the delay circuit 14 and the voltage level shifter 12. The first input terminal IT1 receives the second feedback voltage FB2, and the second input terminal IT2 receives the first feedback voltage FB1. The first comparator OP1 outputs a detection enabling voltage UVPEN to the logic device 10 when the first feedback voltage FB1 is lower than the second feedback voltage FB2. In particular, the detection enabling voltage UVPEN can be a logic high level for enabling the undervoltage detection. In addition, the logic device 10 outputs an undervoltage protection voltage level UVP when the first feedback voltage FB1 is lower than the reference voltage UVREF.

Specifically, the reference voltage UVREF can change dynamically. A switching of the reference voltage UVREF from a logic low level to a logic high level indicates that the system is about to reload or conduct other processes, thus increasing the reference voltage UVREF. On the other hand, a switching of the reference voltage UVREF from a high level to a low level indicates that the system is about to unload or conduct other processes, thus decreasing the reference voltage UVREF.

The first comparator OP1 compares the first feedback voltage FB1 with the second feedback voltage FB2. The first comparator OP1 outputs a detection enabling voltage UVPEN, which is a logic high level, to the logic device 10 when the second feedback voltage FB2 in the positive terminal + is higher than the first feedback voltage FB1 in the negative terminal −. Therefore, the logic device 10 enables the undervoltage detection.

The second comparator OP2 compares the first feedback voltage FB1 with the reference voltage UVREF. The second comparator OP2 outputs a protection enabling voltage UV, which is a logic high level, to the logic device 10 when the reference voltage UVREF in the positive terminal + is higher than the first feedback voltage FB1 in the negative terminal −. Therefore, the logic device 10 enables the undervoltage protection.

In this regard, the undervoltage protection circuit 1 in the present disclosure can correctly detect the undervoltage during reload even when the reference voltage UVREF changes dynamically. Therefore, the present disclosure protects the circuit from undervoltage with increased accuracy.

Unlike conventional undervoltage protection circuits, the design of the present disclosure does not include blanking time. In contrast, the present disclosure employs feedback voltages to conduct undervoltage detection and protection automatically. Therefore, the present disclosure avoids an error voltage between the reference voltage UVREF and the feedback voltage FB resulted from an inappropriate length of the blanking time.

Figure 5:
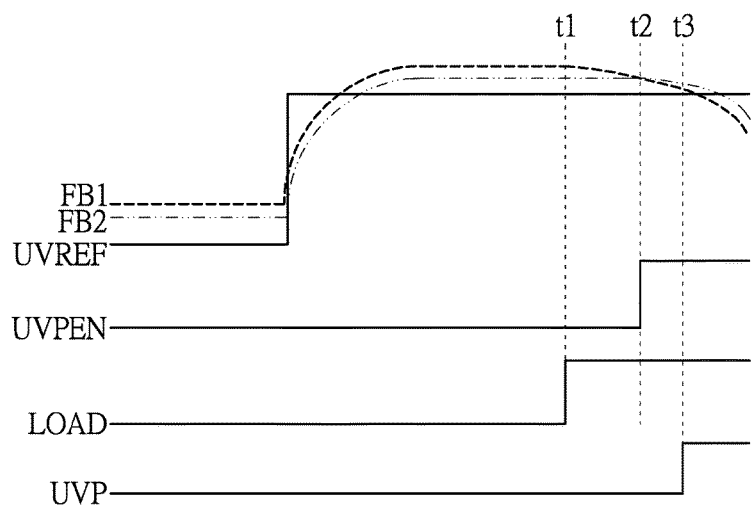
FIG. 5 shows the waveforms of the undervoltage protection circuit in FIG. 4.

FIG. 5 shows the waveforms of the undervoltage protection circuit in FIG. 4. FIG. 5 includes the waveforms of the first feedback voltage FB1, the second feedback voltage FB2, the reference voltage UVREF, the detection enabling voltage UVPEN, a load voltage LOAD, and an undervoltage protection voltage level UVP. At the beginning, the first feedback voltage FB1 is higher than the second feedback voltage FB2, and the second feedback voltage FB2 is higher than the reference voltage UVREF.

Next, the reference voltage UVREF switches from the low level to the high level. The first feedback voltage FB1 and the second voltage FB2 increase with the reference voltage UVREF.

At a timepoint T1, the load voltage LOAD switches from the logic low level to the logic high level, which indicates a reload process. Immediately after the timepoint T1, the first feedback voltage FB1 decreases to be lower than the second feedback voltage FB2. Therefore, the undervoltage protection circuit 1 should be enabled instantly to detect undervoltage.

At a timepoint T2, the decreasing first feedback voltage FB1 crosses the second feedback voltage FB2. The decrease of the second feedback voltage FB2 is delayed due to the delay circuit 14. Therefore, the first comparator OP1 outputs a detection enabling voltage UVPEN, which is a logic high level, to the logic device 10 when the first feedback voltage FB1 decreases to be lower than the second feedback voltage FB2.

In other words, the logic device 10 receives the detection enabling voltage UVPEN, which is a logic high level, when the first feedback voltage FB1 is lower than the second feedback voltage FB2. At this time, the undervoltage protection circuit 1 is enabled to detect undervoltage in the system or circuit. The logic device 10 outputs the undervoltage protection voltage level UVP when the other input terminal of the logic device 10 receives a logic high level.

At a timepoint T3, the first feedback voltage FB1 keeps decreasing during the reload process so that the first feedback voltage FB1 crosses the reference voltage UVREF. Therefore, the second comparator OP2 outputs a protection enabling voltage UV, which is a logic high level, to the logic device 10 when the first feedback voltage FB1 decreases to be lower than the reference voltage UVREF. At this time, both the first comparator OP1 and the second comparator OP2 output a logic high level to the logic device 10, and the undervoltage protection circuit 1 is enabled to protect the system or circuit from undervoltage.

Figure 6:
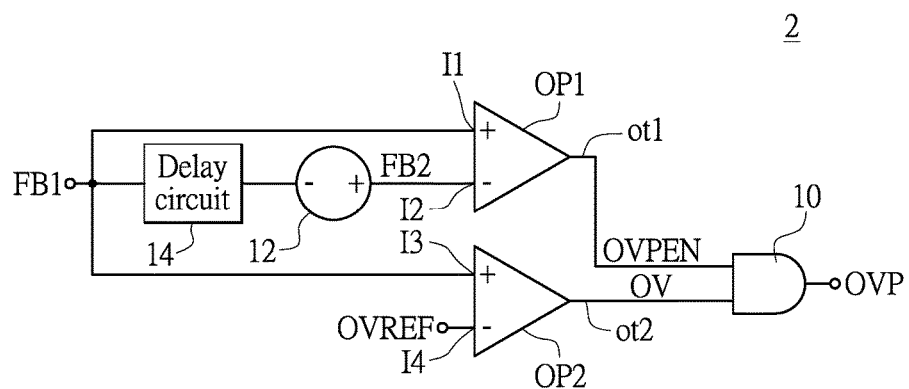
FIG. 6 shows a schematic diagram of an overvoltage protection circuit according to one embodiment of the present disclosure.

FIG. 6 shows a schematic diagram of an overvoltage protection circuit 2 according to one embodiment of the present disclosure. The structure of the overvoltage protection circuit 2 in FIG. 6 is similar to the undervoltage protection circuit 1 in FIG. 4. In practice, the overvoltage protection circuit 2 includes a first comparator OP1, a second comparator OP2 and a logic device 10.

The first comparator OP1 has a first input terminal IT1, a second input terminal IT2 and a first output terminal OT1. The first input terminal IT1 is coupled with a voltage level shifter 12, and the voltage level shifter 12 is coupled with a delay circuit 14. The second comparator OP2 has a third input terminal IT3, a fourth input terminal IT4 and a second output terminal OT2. The third input terminal IT3 receives a first feedback voltage FB1, and the fourth input terminal IT4 receives a reference voltage OVREF.

The first output terminal OT1 and the second output terminal OT2 are coupled with a logic device 10. The first feedback voltage FB1 is converted to the second feedback voltage FB2 by the delay circuit 14 and the voltage level shifter 12. The first input terminal IT1 receives the first feedback voltage FB1, and the second input terminal IT2 receives the second feedback voltage FB2. The first comparator OP1 outputs a detection enabling voltage OVPEN to the logic device 10 when the first feedback voltage FB1 is higher than the second feedback voltage FB2. In particular, the detection enabling voltage OVPEN can be a logic high level for enabling the overvoltage detection. In addition, the logic device 10 outputs an overvoltage protection voltage level OVP when the first feedback voltage FB1 is higher than the reference voltage OVREF.

The voltage level shifter 12, for example, can be a voltage offset circuit. In particular, the voltage level shifter 12 has a positive terminal coupled with the second input terminal IT2 of the first comparator OP1, and a negative terminal coupled with the delay circuit 14. The first feedback voltage FB1 is converted to a second feedback voltage FB2 after adding a deviation voltage by the voltage level shifter 12. Therefore, the second feedback voltage FB2 is higher than the first feedback voltage FB1 under general conditions.

The first comparator OP1 compares the first feedback voltage FB1 with the second feedback voltage FB2. The first comparator OP1 outputs a detection enabling voltage OVPEN, which is a logic high level, to the logic device 10 when the first feedback voltage FB1 in the positive terminal + is higher than the second feedback voltage FB2 in the negative terminal −. Therefore, the logic device 10 enables the overvoltage detection.

The second comparator OP2 compares the first feedback voltage FB1 with the reference voltage OVREF. The second comparator OP2 outputs a protection enabling voltage OV, which is a logic high level, to the logic device 10 when the first feedback voltage FB1 in the positive terminal + is higher than the reference voltage OVREF in the negative terminal −. Therefore, the logic device 10 enables the overvoltage protection.

In this regard, the overvoltage protection circuit 2 in the present disclosure can correctly detect the overvoltage during unload even when the reference voltage OVREF changes dynamically. Therefore, the present disclosure protects the circuit from overvoltage with increased accuracy.

Unlike conventional overvoltage protection circuits, the present disclosure does not include the blanking time design. In contrast, the present disclosure employs feedback voltages to conduct overvoltage detection and protection automatically. Therefore, the present disclosure avoids an error voltage between the reference voltage OVREF and the feedback voltage FB resulted from an inappropriate length of blanking time.

Figure 7:
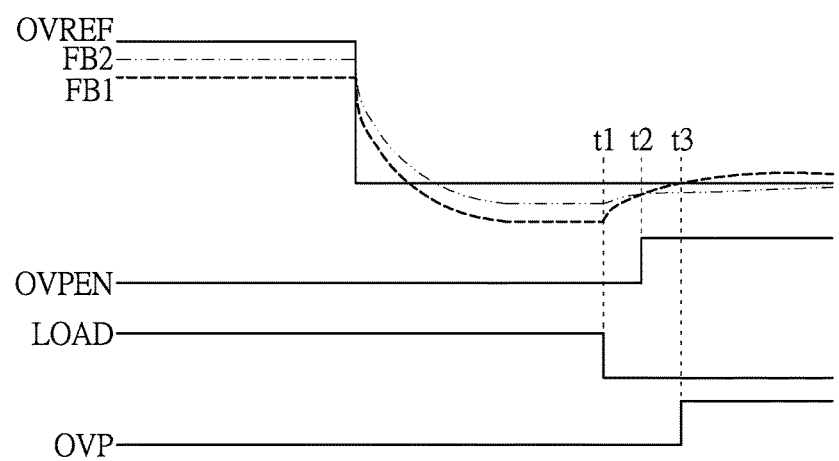
FIG. 7 shows the waveforms of the overvoltage protection circuit in FIG. 6.

FIG. 7 shows the waveforms of the overvoltage protection circuit in FIG. 6. FIG. 7 includes the waveforms of the first feedback voltage FB1, the second feedback voltage FB2, the reference voltage OVREF, the detection enabling voltage OVPEN, a load voltage LOAD, and an overvoltage protection voltage level OVP. At the beginning, the first feedback voltage FB1 is lower than the second feedback voltage FB2, and the second feedback voltage FB2 is lower than the reference voltage OVREF.

Next, the reference voltage OVREF switches from the high level to the low level. The first feedback voltage FB1 and the second voltage FB2 decrease with the reference voltage OVREF.

At a timepoint T1, the load voltage LOAD switches from the logic high level to the logic low level, which indicates an unload process. Immediately after the timepoint T1, the first feedback voltage FB1 increases to be higher than the second feedback voltage FB2. Therefore, the overvoltage protection circuit 1 should be enabled instantly to detect overvoltage.

At a timepoint T2, the increasing first feedback voltage FB1 crosses the second feedback voltage FB2. The increase of the second feedback voltage FB2 is delayed due to the delay circuit 14. Therefore, the first comparator OP1 outputs a detection enabling voltage OVPEN, which is a logic high level, to the logic device 10 when the first feedback voltage FB1 increases to be higher than the second feedback voltage FB2.

In other words, the logic device 10 receives the detection enabling voltage OVPEN, which is a logic high level, when the first feedback voltage FB1 is higher than the second feedback voltage FB2. At this time, the overvoltage protection circuit 1 is enabled to detect overvoltage in the system or circuit. The logic device 10 outputs the overvoltage protection voltage level OVP when the other input terminal of the logic device 10 receives a logic high level.

At a timepoint T3, the first feedback voltage FB1 keeps increasing during the unload process so that the first feedback voltage FB1 crosses the reference voltage OVREF. Therefore, the second comparator OP2 outputs a protection enabling voltage OV, which is a logic high level, to the logic device 10 when the first feedback voltage FB1 increases to be higher than the reference voltage OVREF. At this time, both the first comparator OP1 and the second comparator OP2 output a logic high level to the logic device 10, and the overvoltage protection circuit 1 is enabled to protect the system or circuit from overvoltage.

In summary, the present disclosure improves the design of the undervoltage and overvoltage protection circuits. In particular, the first comparator compares the first feedback voltage with the second feedback voltage, and the second comparator compares the first feedback voltage with the reference voltage. The first feedback voltage is converted to the second feedback voltage after a deviation voltage is subtracted or added by the voltage level shifter. The reference voltage changes dynamically from a low level to a high level, or from a high level to a low level. The undervoltage/overvoltage protection circuit is enabled to detect undervoltage/overvoltage in the system or circuit when the first feedback voltage crosses the second feedback voltage. The undervoltage/overvoltage protection circuit is enabled to protect the system or circuit from undervoltage/overvoltage when the first feedback voltage crosses the reference voltage. Therefore, the undervoltage and overvoltage protection circuit in the present disclosure are more convenient in practical application than the conventional ones.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. An undervoltage protection circuit comprising:
   a first comparator having a first input terminal, a second input terminal and a first output terminal, the first input terminal being coupled with a voltage level shifter, and the voltage level shifter being coupled with a delay circuit; and
   a second comparator having a third input terminal, a fourth input terminal and a second output terminal, the third input terminal receiving a reference voltage, and the fourth input terminal receiving a first feedback voltage;
   wherein the first output terminal and the second output terminal are coupled with a logic device, the first feedback voltage is converted to a second feedback voltage by the delay circuit and the voltage level shifter, the first input terminal receives the second feedback voltage, and the second input terminal receives the first feedback voltage;
   wherein the first comparator outputs a detection enabling voltage to the logic device when the first feedback voltage is lower than the second feedback voltage, and the logic device outputs an undervoltage protection voltage level when the first feedback voltage is lower than the reference voltage.

2. The undervoltage protection circuit according to claim 1, wherein the first input terminal and the third input terminal are positive input terminals, the second input terminal and the fourth terminal are negative input terminals, and the logic device is an AND gate.

3. The undervoltage protection circuit according to claim 1, wherein the voltage level shifter has a positive terminal coupled with the delay circuit, and a negative terminal coupled with the first input terminal.

4. The undervoltage protection circuit according to claim 1, wherein the reference voltage changes dynamically, and the detection enabling voltage is a logic high level for enabling the undervoltage detection.

5. The undervoltage protection circuit according to claim 1, wherein the first feedback voltage decreases to be lower than the second feedback voltage after the timepoint of a reload.

6. An overvoltage protection circuit, comprising:
   a first comparator having a first input terminal, a second input terminal and a first output terminal, the second input terminal being coupled with a voltage level shifter, and the voltage level shifter being coupled with a delay circuit;
   a second comparator having a third input terminal, a fourth input terminal and a second output terminal, the third input terminal receiving a first feedback voltage, and the fourth input terminal receiving a reference voltage;

wherein the first output terminal and the second output terminal are coupled with a logic device, the first feedback voltage is converted to a second feedback voltage by the delay circuit and the voltage level shifter, the first input terminal receives the first feedback voltage, and the second input terminal receives the second feedback voltage;

wherein the first comparator outputs an detection enabling voltage to the logic device when the first feedback voltage is higher than the second feedback voltage, and the logic device outputs an overvoltage protection voltage level when the first feedback voltage is higher than the reference voltage.

7. The overvoltage protection circuit according to claim 6, wherein the first input terminal and the third input terminal are positive input terminals, the second input terminal and the fourth terminal are negative input terminals, and the logic device is an AND gate.

8. The overvoltage protection circuit according to claim 6, wherein the voltage level shifter has a positive terminal coupled with the second input terminal, and a negative terminal coupled with the delay circuit.

9. The overvoltage protection circuit according to claim 6, wherein the reference voltage changes dynamically, and the detection enabling voltage is a logic high level for enabling the overvoltage detection.

10. The overvoltage protection circuit according to claim 6, wherein the first feedback voltage increases to be higher than the second feedback voltage after the timepoint of an unload.

* * * * *